US007436382B2

(12) United States Patent
Okuda et al.

(10) Patent No.: US 7,436,382 B2
(45) Date of Patent: *Oct. 14, 2008

(54) CORRECTION DATA OUTPUT DEVICE, CORRECTION DATA CORRECTING METHOD, FRAME DATA CORRECTING METHOD, AND FRAME DATA DISPLAYING METHOD

(75) Inventors: Noritaka Okuda, Tokyo (JP); Jun Someya, Tokyo (JP); Masaki Yamakawa, Tokyo (JP)

(73) Assignee: Mitsubishi Denki Kabushiki Kaisha, Tokyo (JP)

( * ) Notice: Subject to any disclaimer, the term of this patent is extended or adjusted under 35 U.S.C. 154(b) by 963 days.

This patent is subject to a terminal disclaimer.

(21) Appl. No.: 10/677,282

(22) Filed: Oct. 3, 2003

(65) Prior Publication Data

US 2004/0160617 A1 Aug. 19, 2004

(30) Foreign Application Priority Data

Feb. 13, 2003 (JP) ............................ 2003-035681

(51) Int. Cl.
*G09G 3/36* (2006.01)
*G09G 5/10* (2006.01)
*H04N 1/60* (2006.01)

(52) U.S. Cl. .......................... 345/89; 345/690; 358/1.9

(58) Field of Classification Search .................. 358/1.9, 358/521; 345/87, 89, 204, 690, 88, 212, 345/545, 547, 605; 348/714, 715, 718, 790
See application file for complete search history.

(56) References Cited

U.S. PATENT DOCUMENTS

| | | | | |
|---|---|---|---|---|
| 7,034,788 | B2 * | 4/2006 | Someya et al. | 345/89 |
| 2001/0038372 | A1 * | 11/2001 | Lee | 345/89 |
| 2002/0030652 | A1 * | 3/2002 | Shibata et al. | 345/87 |
| 2002/0033789 | A1 * | 3/2002 | Miyata et al. | 345/89 |
| 2002/0033813 | A1 | 3/2002 | Matsumura et al. | |
| 2002/0050965 | A1 | 5/2002 | Oda et al. | |
| 2003/0038768 | A1 * | 2/2003 | Sakashita | 345/87 |
| 2004/0012551 | A1 * | 1/2004 | Ishii | 345/87 |

FOREIGN PATENT DOCUMENTS

| | | |
|---|---|---|
| EP | 0 500 358 | 8/1992 |
| JP | 09-081083 A | 3/1997 |
| JP | 2616652 B2 | 3/1997 |
| JP | 3041951 B2 | 3/2000 |
| JP | 2002-189458 | 7/2002 |

* cited by examiner

*Primary Examiner*—King Poon
*Assistant Examiner*—Peter L Cheng
(74) *Attorney, Agent, or Firm*—Birch, Stewart, Kolasch & Birch, LLP

(57) ABSTRACT

A correction data output device according to the invention includes correction data outputting device for outputting correction data that corrects object frame data included in an inputted image signal on the basis of the mentioned object frame data and previous frame data, which are one frame period previous to the object frame data, and correction data correcting device for correcting correction data that corrects and outputs the correction data outputted from the mentioned correction data outputting device on the basis of the mentioned object frame data and the mentioned previous frame data.

12 Claims, 13 Drawing Sheets

8 CHANGE-QUANTITY CALCULATING DEVICE
9 PREVIOUS FRAME IMAGE REPRODUCER
10 FRAME DATA CORRECTION DEVICE

8 CHANGE-QUANTITY CALCULATING DEVICE
9 PREVIOUS FRAME IMAGE REPRODUCER
10 FRAME DATA CORRECTION DEVICE n FRAME

| | A | B | C | D |
|---|---|---|---|---|
| a | 52 | 152 | 52 | 52 |
| b | 52 | 152 | 52 | 52 |
| c | 48 | 148 | 48 | 48 |
| d | 48 | 148 | 48 | 48 |

(a)

| La=100 | | Lb=100 | |
|---|---|---|---|
| 0 | 1 | 0 | 0 |
| 0 | 1 | 0 | 0 |
| 0 | 1 | 0 | 0 |
| 0 | 1 | 0 | 0 |

(b)

| | A | B | C | D |
|---|---|---|---|---|
| a | 50 | 150 | 50 | 50 |
| b | 50 | 150 | 50 | 50 |
| c | 50 | 150 | 50 | 50 |
| d | 50 | 150 | 50 | 50 |

(c)

| | A | B | C | D |
|---|---|---|---|---|
| a | 0 | 0 | 0 | 0 |
| b | 0 | 0 | 0 | 0 |
| c | 0 | 0 | 0 | 0 |
| d | 0 | 0 | 0 | 0 |

(g)

| | A | B | C | D |
|---|---|---|---|---|
| a | 52 | 152 | 52 | 52 |
| b | 52 | 152 | 52 | 52 |
| c | 48 | 148 | 48 | 48 |
| d | 48 | 148 | 48 | 48 |

(h)

n+1 FRAME

| | A | B | C | D |
|---|---|---|---|---|
| a | 52 | 152 | 52 | 52 |
| b | 52 | 152 | 52 | 52 |
| c | 48 | 148 | 48 | 48 |
| d | 48 | 148 | 48 | 48 |

(d)

| La=100 | | Lb=100 | |
|---|---|---|---|
| 0 | 1 | 0 | 0 |
| 0 | 1 | 0 | 0 |
| 0 | 1 | 0 | 0 |
| 0 | 1 | 0 | 0 |

(e)

| | A | B | C | D |
|---|---|---|---|---|
| a | 50 | 150 | 50 | 50 |
| b | 50 | 150 | 50 | 50 |
| c | 50 | 150 | 50 | 50 |
| d | 50 | 150 | 50 | 50 |

(f)

Fig. 2

| | ① | ② | ③ |
|---|---|---|---|
| w | 0 | 1／2 | −1／4 |

22 GRADATION CHANGE DETECTING MEANS

CORRECTION DATA OUTPUT DEVICE, CORRECTION DATA CORRECTING METHOD, FRAME DATA CORRECTING METHOD, AND FRAME DATA DISPLAYING METHOD

This nonprovisional application claims priority under 35 U.S.C. § 119(a) on Patent Application No. 2003-035681 filed in JAPAN on Feb. 13, 2003, which is herein incorporated by reference.

BACKGROUND OF THE INVENTION

1. Field of the Invention

The present invention relates to a device and a method for improving speed of change in number of gradations and, more particularly, to a device and a method suitable for a matrix-type display such as liquid crystal panel.

2. Description of the Related Art

Liquid crystal used in a liquid crystal panel changes in transmittance due to cumulative response effect, and therefore the liquid crystal cannot cope with a moving image that changes rapidly. Hitherto, in order to solve this disadvantage, a liquid crystal drive voltage applied at the time of gradation change is increased exceeding a normal drive voltage, thereby improving response speed of the liquid crystal. (See the Japanese Patent No. 2616652, pages 3 to 5, FIG. 1, for example.)

In the case where the liquid crystal drive voltage is increased as described above, when increasing number of display picture elements in the liquid crystal panel, image data for one frame written in an image memory, in which inputted image data are recorded, increase. This brings about a problem that a large memory capacity is required. In order to reduce the capacity of the image memory, picture element data are skipped and recorded on the image memory. Then, when reading out the image memory, picture element data same as the recorded picture element data are outputted for the picture elements of which picture element data are skipped in several prior arts. (See the Japanese Patent No. 3041951, pages 2 to 4, FIG. 2, for example.)

As described above, when number of gradations in one frame that is displayed (this frame is hereinafter referred to as a display frame.) changes that in the other frame which is one frame previous to the display frame, the gradation change speed of the liquid crystal panel is improved by increasing a liquid crystal drive voltage applied at the time of displaying the display frame so as to exceed the normal liquid crystal drive voltage. However, in the case of the prior arts described above, the liquid crystal drive voltage to be increased or decreased is determined only on the basis of number of gradations in the display frame and that in the frame which is one frame previous to the display frame. As a result, in the case where the liquid crystal drive voltage includes any liquid crystal voltage corresponding to any noise component, the liquid crystal drive voltage corresponding to the noise component is also increased or decreased, which results in deterioration of image quality of the display frame. Particularly in the case of a liquid crystal drive voltage of which gradation minutely changes from the frame, which is one frame previous to the display frame, to the display frame, the liquid crystal drive voltage corresponding to the noise component is influenced more seriously than the case where the gradation changes largely, and image quality of the display frame tends to deteriorate.

In the case where capacity of the memory is reduced by skipping the image data stored in the image memory, the voltage is not properly controlled at the portion where the image data have been skipped. As a result, data of any portion, of which line is thin, such as contour of any image or characters are skipped. Thus, a problem exists in that image quality is deteriorated due to unnecessary voltage being applied. Another problem exists in that effect of improvement in the gradation change speed in the liquid crystal panel is decreased due to necessary voltage not being applied.

SUMMARY OF THE INVENTION

The present invention was made to solve the above-discussed problems.

A first object of the invention is to obtain a correction data output device and a correction data correcting method for outputting correction data that appropriately controls a liquid crystal drive voltage in the case where there is a minute change in gradation between a display frame and a frame which is one frame previous to the display frame, even if gradation change speed is improved by increasing the liquid crystal drive voltage exceeding a normal liquid crystal drive voltage in an image display device in which a liquid crystal panel or the like is used.

A second object of the invention is to obtain a frame data correction device or a frame data correcting method, in which frame data corresponding to a frame included in an image signal is corrected on the basis of correction data outputted by the mentioned correction data output device or the correction data correcting method, and frame data that makes it possible to display a frame with little deterioration in the image quality on a liquid crystal panel or the like are outputted.

A third object of the invention is to obtain the mentioned correction data output device or the mentioned frame data correction device capable of reducing an image memory, in which the frame data are recorded, without skipping any frame data corresponding to an object frame.

A fourth object of the invention is to obtain a frame data display device or a frame data displaying method, which makes it possible to display a frame with little deterioration in image quality due to any corrected frame data outputted by the mentioned frame data correction device or the mentioned frame data correcting method.

In order to accomplish the foregoing objects, a correction data output device according to the invention includes correction data outputting means for outputting correction data that corrects object frame data included in an inputted image signal on the basis of the mentioned object frame data and previous frame data, which are one frame period previous to the object frame data, and correction data correcting means for correcting correction data that corrects and outputs the correction data outputted from the mentioned correction data outputting means on the basis of the mentioned object frame data and the mentioned previous frame data.

As a result, according to the invention, it is possible to display the mentioned object frame with little deterioration on a display device as well as improve speed of change in gradation on the display device.

The foregoing and other objects, features, aspects, and advantages of the present invention will become more apparent from the following detailed description of the present invention when taken in conjunction with the accompanying drawings.

BRIEF DESCRIPTION OF THE DRAWINGS

FIG. 2 is a diagram for explaining previous frame reproduction image data according to Embodiment 1.

DESCRIPTION OF THE PREFERRED EMBODIMENTS

Embodiment 1

Figure 1:
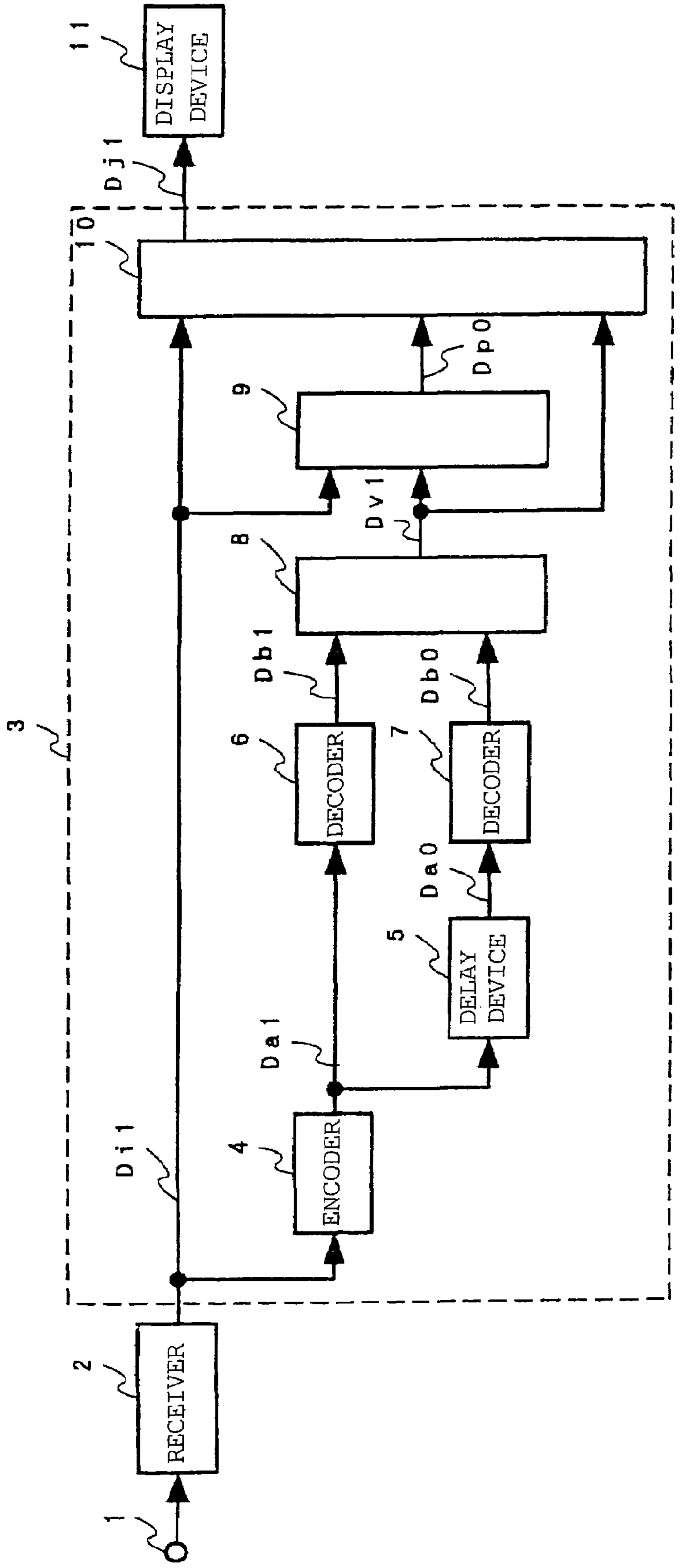
FIG. 1 is a diagram showing a constitution of an image display device according to Embodiment 1 of the present invention.

FIG. 1 is a block diagram showing a constitution of an image display device according to this Embodiment 1. In this image display device, image signals are inputted to a receiver 2 through an input terminal 1.

The receiver 2 outputs frame data Di1 corresponding to one of frames (hereinafter also referred to as image) included in the image signal to the image correction device 3. In this respect, the frame data Di1 are the ones that include a signal corresponding to brightness, density, etc. of the frame, a color-difference signal, etc., and control a liquid crystal drive voltage. In the following description, frame data to be corrected by the image correction device 3 are referred to as object frame data, and a frame corresponding to the foregoing object frame data is referred to as object frame.

The image correction device 3 outputs corrected frame data Dj1 obtained by correcting the object frame data Di1 to a display device 11. The display device 11 displays the object frame on the basis of the inputted corrected frame data Dj1 described above. This Embodiment 1 shows an example in which the display device 11 is comprised of a liquid crystal panel.

Described below is operation of the image correction device 3 according to this Embodiment 1.

An encoder 4 in the image correction device 3 encodes the object frame data Di1 inputted from the receiver 2. Then, the encoder 4 outputs first encoded data Da1 obtained by encoding the object frame data Di1 to a delay device 5 and a first decoder 6. It is possible for the encoder 4 to encode the frame data by employing any coding method for static image including block truncation coding (BTC) method such as FBTC or GBTC, two-dimensional discrete cosine transformation coding method such as JPEG, predictive coding method such as JPEG-LS, or wavelet transformation method such as JPEG2000. It is also possible to employ either a reversible coding method in which frame data after encoding completely coincides with frame data before encoding, or a non-reversible coding method in which frame data after encoding do not completely coincide with the frame data before encoding as the mentioned coding method for static image. It is further possible to employ either a fixed-length coding method in which quantity of code is fixed or a variable-length coding method in which quantity of code is not fixed.

The delay device 5, to which the first encoded data Da1 is inputted from the encoder 4, outputs second encoded data Da0 obtained by encoding frame data corresponding to a frame which is one frame previous to the mentioned object frame (the frame data corresponding to a frame which is one frame previous to the object frame are hereinafter referred to as previous frame data.) to a second decoder 7. The mentioned delay device 5 is comprised of recording means such as semiconductor memory, magnetic disk, or optical disk.

The first decoder 6, to which the first encoded data Da1 is inputted from the encoder 4, outputs first decoded data Db1 obtained by decoding the mentioned first encoded data Da1 to a change-quantity calculating device 8.

The second decoder 7, to which the second encoded data Da0 is inputted from the delay device 5, outputs second decoded data Db0 obtained by decoding the mentioned second encoded data Da0 to the change-quantity calculating device 8.

The change-quantity calculating device 8 outputs a change quantity Dv1 between the mentioned first decoded data Db1 inputted from the mentioned first decoder 6 and the mentioned second decoded data Db0 inputted from the mentioned second decoder 7 to a previous frame image reproducer 9. The change quantity Dv1 is obtained by subtracting the first decoded data Db1 from the second decoded data Db0. The change quantity Dv1 is obtained for each frame data corresponding to picture element of the liquid crystal panel in the display device 11. It is also preferable to obtain the change quantity Dv1 by subtracting the second decoded data Db0 from the first decoded data Db1 as a matter of course.

The previous frame image reproducer 9 outputs previous frame reproduction image data Dp0 to a frame data correction device 10 on the basis of the mentioned object frame data Di1 and the mentioned change quantity Dv1 inputted from the mentioned change-quantity calculating device 8.

The mentioned previous frame reproduction image data Dp0 is obtained by adding the mentioned change quantity Dv1 to the object frame data Di1, in the case where the change quantity Dv1 is obtained by subtracting the first decoded data Db1 from the second decoded data Db0 in the mentioned change-quantity calculating device 8. In the case where the mentioned change quantity Dv1 is obtained by subtracting the second decoded data Db0 from the first decoded data Db1, the mentioned previous frame reproduction image data Dp0 is obtained by subtracting the mentioned change quantity Dv1 from the frame data Di1. Further, in the case where there is no change in number of gradations between the object frame and the frame being one frame previous to the object frame, the mentioned previous frame reproduction image data Dp0 are frame data having the same value as the frame being one frame previous to the object frame.

The frame data correction device 10 corrects the mentioned object frame data Di1 on the basis of the mentioned object frame data Di1, the mentioned previous frame reproduction image data Dp0 inputted from the mentioned previous frame image reproducer 9 and the mentioned change quantity Dv1 inputted from the mentioned change-quantity calculating device 8, and outputs the corrected frame data Dj1 obtained by carrying out the mentioned correction to the display device 11.

In the case where there is no change in number of gradations between the object frame and the frame being one frame previous to the mentioned object frame, the mentioned previous frame reproduction image data Dp0 are frame data having the same value as the frame being one frame previous to the object frame as mentioned above, which is hereinafter described more specifically with reference to FIG. 2.

Referring to FIG. 2, (*a*) indicates values of the previous frame data Di0, and (*d*) indicates values of the object frame data Di1.

Then, (*b*) indicates values of the second encoded data Da0 corresponding to the mentioned previous frame data Di0, and (*e*) indicates values of the first encoded data Da1 corresponding to the mentioned object frame data Di1 . In this arrangement, FIGS. 2(*b*) and (*e*) show encoded data obtained through FTBC coding. Representative values (La, Lb) show data of 8 bits, and one bit is assigned to each picture element.

Further, (*c*) indicates values of the second decoded data Db0 corresponding to the mentioned second encoded data Da0, and (*f*) indicates values of the first decoded data Db1 corresponding to the mentioned first encoded data Da1.

Furthermore, (*g*) indicates values of the change quantity Dv1 produced on the basis of the second decoded data Db0 shown in (*c*) described above and the foregoing first decoded data Db1 shown in (*f*) described above, and (*h*) indicates values of the previous frame reproduction image data Dp0 outputted from the previous frame image reproducer 9 to the frame data correction device 10.

When comparing (*a*) with (*c*) or (*d*) with (*f*) in FIG. 2, it is clearly understood that any error is produced as a result of encoding or decoding as to the mentioned first decoded data Db1 and second decoded data Db0. However, influence of the errors caused by the encoding or decoding is eliminated by obtaining the previous frame reproduction image data Dp0 (shown in (*h*)) on the basis of the object frame data Di1 as well as obtaining the change quantity Dv1 (shown in (*g*)) obtained on the basis of the mentioned first decoded data Db1 and the mentioned second decoded data Db0. Accordingly, as is understood from (*a*) and (*h*) in FIG. 2, the previous frame reproduction image data Dp0 has the same value as the frame data Di0 corresponding to the frame which is one frame previous to the object frame.

Figure 3:
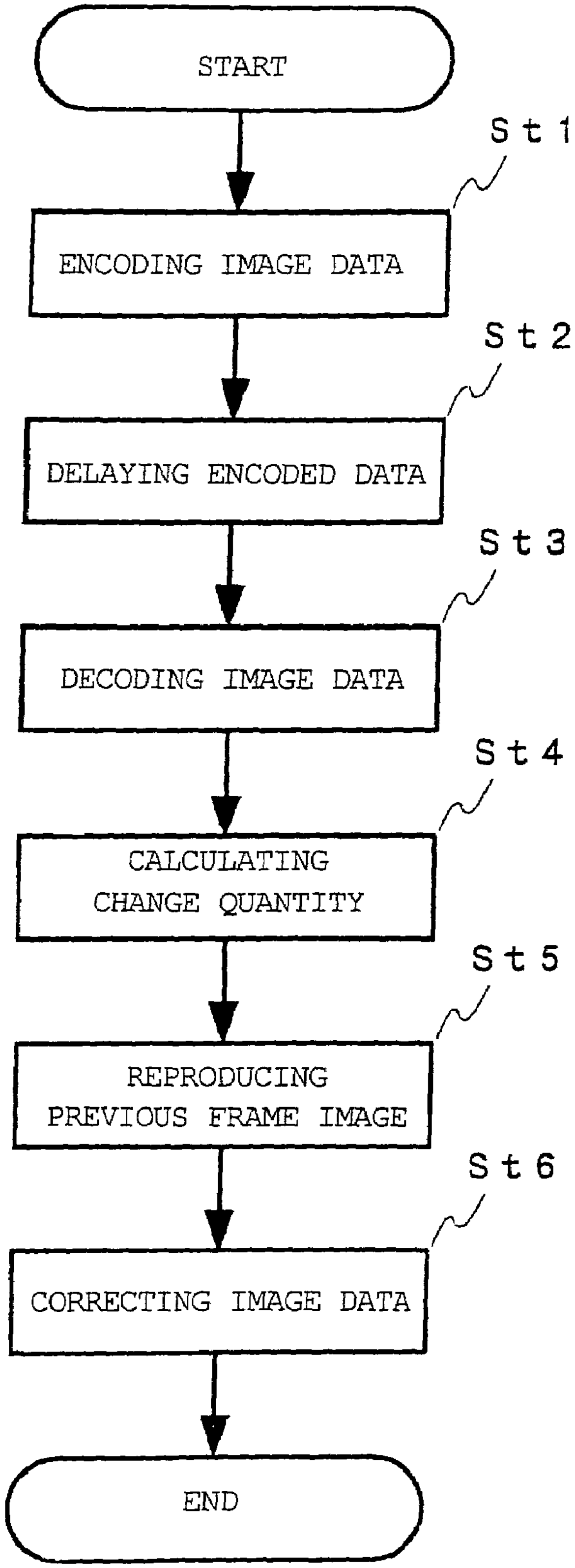
FIG. 3 is a flowchart showing operation of an image correction device according to Embodiment 1.

The operation of the image correction device 3 described above can be shown in the flowchart of FIG. 3. In first step St1 (step of encoding the image data), the encoder 4 encodes the object frame data Di1.

In second step St2 (step of delaying the encoded data), the first encoded data Da1 is inputted to the delay device 5, and the second encoded data Da0 recorded on the delay device 5 is outputted.

In third step St3 (step of decoding the image data), the first encoded data Da1 is decoded by the first decoder 6, and the first decoded data Db1 is outputted. The second encoded data Da0 is decoded by the second decoder 7, and the second decoded data Db0 is outputted.

In fourth step St4 (step of calculating change quantity), the change quantity Dv1 is calculated by the change-quantity calculating device 8 on the basis of the first decoded data Db1 and the second decoded data Db0.

In fifth step St5 (step of reproducing the previous frame image), the previous frame image reproducer 9 outputs the previous frame reproduction image data Dp0.

In sixth step St6 (step of correcting the image data), the frame data correction device 10 corrects the object frame data Di1, and the corrected frame data Dj1 obtained by the mentioned correction is outputted to the display device 11.

The steps from first step St1 to sixth step St6 described above are carried out for each frame data corresponding to the picture element of the liquid crystal panel of the display device 11.

Figure 4:
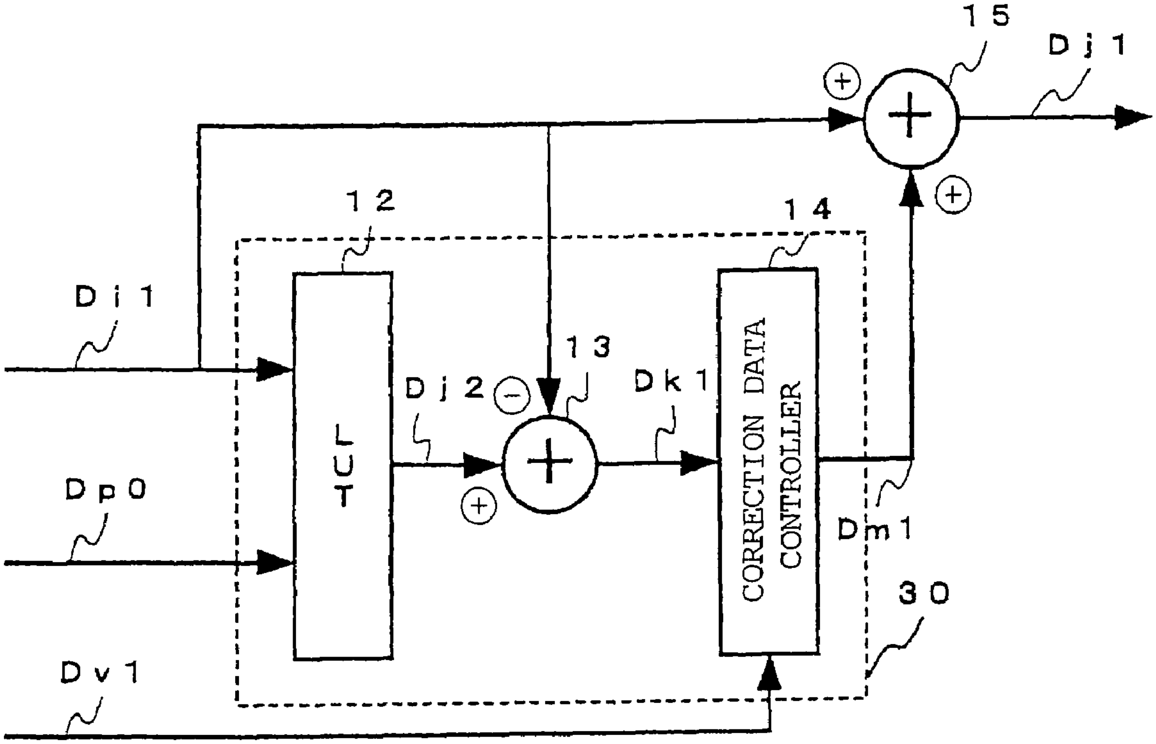
FIG. 4 is a diagram showing constitution of a frame data correction device 10 according to Embodiment 1.

FIG. 4 shows an example of internal constitution of the frame data correction device 10. This frame data correction device 10 is hereinafter described.

The object frame data Di1, the previous frame reproduction image data Dp0 outputted from the previous frame image reproducer 9, and the change quantity Dv1 outputted from the change-quantity calculating device 8 are inputted to a correction data output device 30. The correction data output device 30 outputs correction data Dm1 to an adder 15 on the basis of the mentioned object frame data Di1, the mentioned previous frame reproduction image data Dp0, and the mentioned change quantity Dv1.

In the adder 15, the object frame data Di1 is corrected by adding the mentioned correction data Dm1 to the mentioned object frame data Di1, and the corrected frame data Dj1 obtained through the mentioned correction is outputted to the display device 11.

Described hereinafter is the correction data output device 30 incorporated in the foregoing frame data correction device 10.

The mentioned object frame data Di1 and the mentioned previous frame reproduction image data Dp0 inputted to the foregoing correction data output device 30 are then inputted to a look-up table 12 (hereinafter referred to as LUT).

This LUT 12 outputs LUT data Dj2 to a adder 13 on the basis of the mentioned object frame data Di1 and the mentioned previous frame reproduction image data Dp0. The LUT data Dj2 are data that make it possible to complete the change in gradation in the liquid crystal panel of the display device 11 within one frame period.

Figure 5:
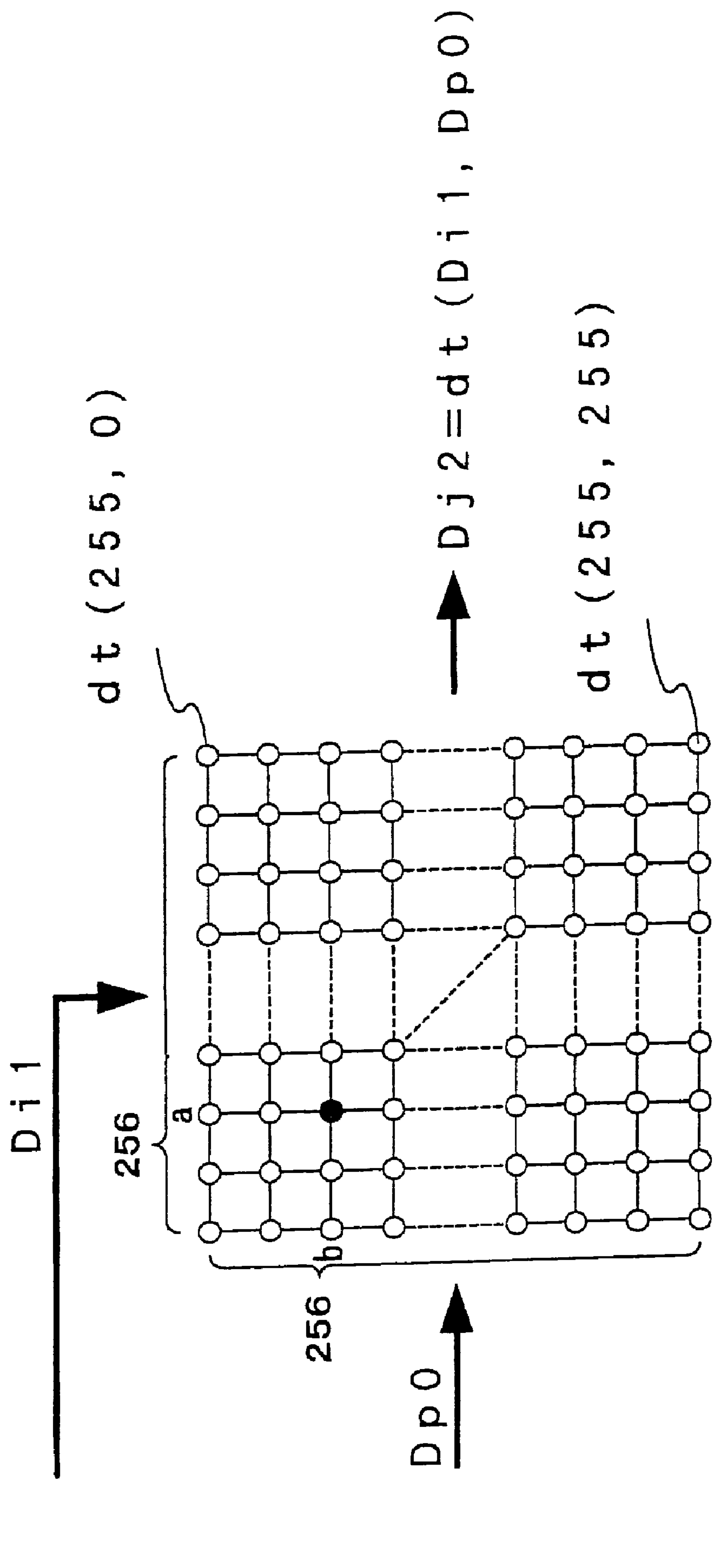
FIG. 5 is a diagram showing constitution of an LUT according to Embodiment 1.

Now constitution of the LUT 12 is described in detail. FIG. 5 is a schematic diagram showing constitution of the LUT 12. The LUT 12 is composed of the mentioned LUT data Dj2 set on the basis of the device, structure and so on of the image display. Number of the LUT data Dj2 is determined on the basis of number of gradations the display device 11 can display. For example, in the case where number of gradations that can be displayed on the display device 11 is 4 bits, (16×16) LUT data Dj2 are recorded on the LUT 12, and in the case where number of gradations is 10 bits, (1024×1024) LUT data Dj2 are recorded. FIG. 5 shows an example in which number of gradations that can be displayed on the display device 11 is 8 bits, and accordingly number of the LUT data Dj2 is (256×256).

In the example shown in FIG. 5, the object frame data Di1 and the previous frame reproduction image data Dp0 are respectively data of 8 bits, and their value is from 0 to 255. Therefore, the LUT 12 has (256×256) data two-dimensionally arranged in two dimensions shown in FIG. 5 as described above, and outputs the LUT data Dj2 on the basis of the object frame data Di1 and the previous frame reproduction image data Dp0. More specifically, referring to FIG. 5, in the case where value of the mentioned object frame data Di1 is "a" and value of the mentioned previous frame reproduction image data Dp0 is "b", the LUT data Dj2 corresponding to a black dot in FIG. 5 are outputted from the LUT 12.

Described below is how the LUT data Dj2 is set.

In the case where number of gradations the display device 11 can display is 8 bits (0 to 255 gradations), when number of gradations of the display frame corresponds to ½ (127 gradations) of number of gradations the display device 11 can display, a voltage V50 is applied to the liquid crystal so that transmittance thereof becomes 50%. Likewise, when number of gradations of the display frame corresponds to ¾ (191 gradations) of number of gradations the display device 11 can display, a voltage V75 is applied to the liquid crystal so that transmittance thereof becomes 75%.

Figure 6:
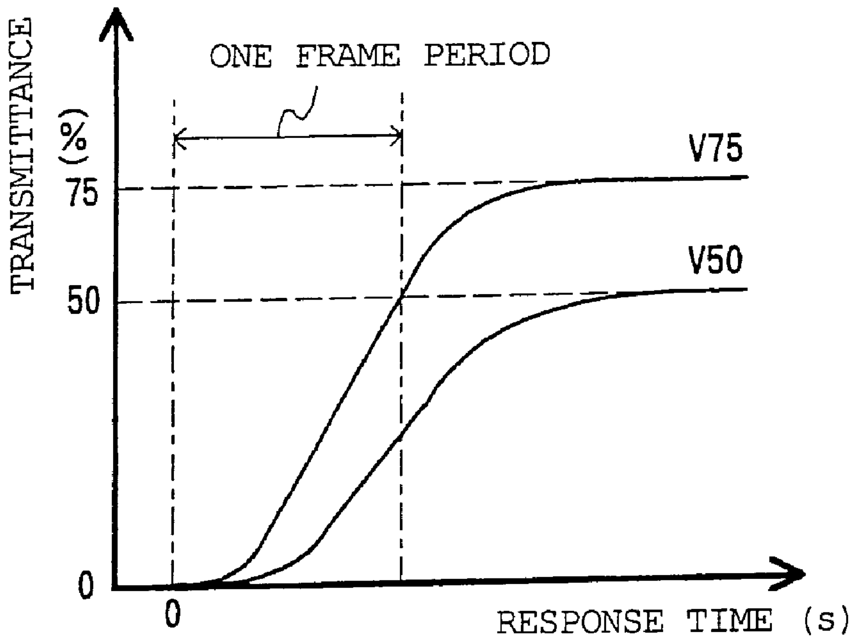
FIG. 6 is a graph showing an example of a response characteristic in the case where a voltage is applied to liquid crystal.

FIG. 6 is a graphic diagram showing response time of the liquid crystal in the case where the mentioned voltage V50 is applied to the liquid crystal of which transmittance is 0% and in the case where the mentioned voltage V75 is applied to the liquid crystal. Even if the voltage corresponding to a target transmittance is applied, it takes a time longer than one frame period to attain the target transmittance of the liquid crystal as shown in FIG. 6. It is therefore necessary to apply a voltage higher than the voltage corresponding to the target transmittance in order to attain the target liquid crystal transmittance within one frame period.

As shown in FIG. 6, in the case where the voltage V75 is applied, the transmittance of the liquid crystal attains 50% when one frame period has passed. Therefore, in the case where the desired liquid crystal transmittance is 50%, it is possible to increase the liquid crystal transmittance to 50% within one frame period by applying the voltage V75 to the liquid crystal. In the case where number of gradations of the frame to be displayed on the display device 11 changes from a minimum number of gradations (liquid crystal transmittance 0%) in number of gradations that can be displayed on the display device 11 to ½ gray level (liquid crystal transmittance 50%), it is possible to complete the change in the gradations in one frame period by correcting the object frame data Di1 on the basis of correction data that makes it possible to correct and change the frame data into frame data corresponding to ¾ gray level (liquid crystal transmittance 75%).

Figure 7:
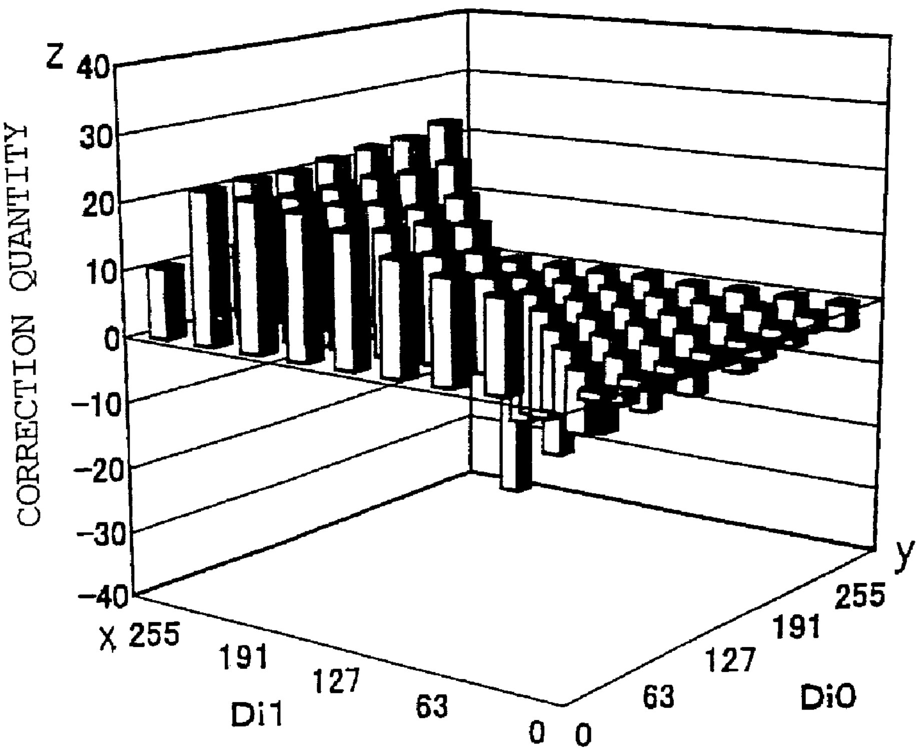
FIG. 7 is a graph showing an example of correction data.

FIG. 7 is a graph schematically showing the size of the foregoing correction data obtained on the basis of the characteristics of the liquid crystal as described above.

In FIG. 7, the x-axis indicates number of gradations corresponding to the object frame data Di1, and the y-axis indicates number of gradations corresponding to the previous frame data Di0. The z-axis indicates the size of the correction data necessary in the case where there is a change in the gradations between the object frame and the frame being one frame previous to the foregoing object frame in order to complete the foregoing change in the gradations within one frame period. Although (256×256) correction data are obtained in the case where number of gradations that can be displayed on the display device 11 is 8 bits, the correction data are simplified and shown as (8×8) correction data in FIG. 7.

Figure 8:
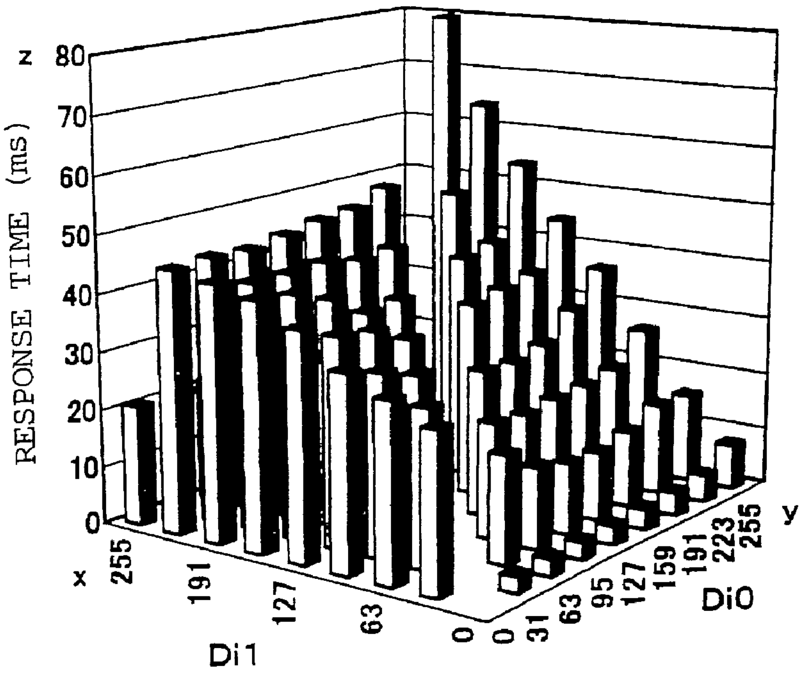
FIG. 8 is a graph showing an example of a response speed of the liquid crystal.

FIG. 8 shows an example of gradation change speed in the liquid crystal panel. In FIG. 8, the x-axis indicates the value of the frame data Di1 corresponding to number of gradations of the display frame, the y-axis indicates the value of the frame data Di0 corresponding to number of gradations of the frame which is one frame previous to the foregoing display frame, and the z-axis indicates the time required for completing the change in the gradations from the frame which is one frame previous to the foregoing display frame to the display frame in the display device 11, i.e., the response time.

Although FIG. 8 shows an example in which number of gradations that can be displayed on the display device 11 is 8 bits, the response speed corresponding to a combination of numbers of gradations is simplified and shown in (8×8) ways as well as in FIG. 7.

As shown in FIG. 8, the response speed in changing the gradations, for example, from a halftone to a higher gray level (for example, from gray to white) is low in the liquid crystal panel. Therefore, in the correction data shown in FIG. 7, the correction data corresponding to a change where the response speed is low is arranged to be big in size.

The correction data set as described above is added to the frame data corresponding to the desired number of gradations, and the frame data where the correction data has been added is set as the LUT data Dj2 in the LUT 12. In taking the case where the liquid crystal transmittance changes from 0% to 50% in FIG. 6, the frame data corresponding to the desired number of gradations is data corresponding to ½ gray level, and the foregoing correction data is added to the foregoing data, and consequently, the foregoing data is changed into data corresponding to ¾ gray level. The foregoing data corresponding to ¾ gray level is recorded as the LUT data Dj2 corresponding to the case where number of gradations is changed from 0 gray level to ½ gray level.

Figure 9:
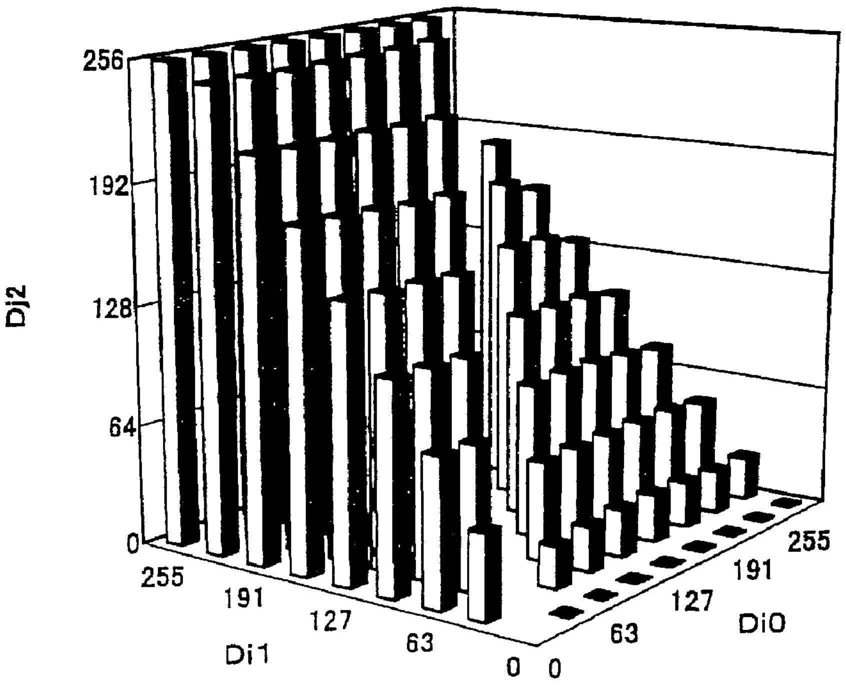
FIG. 9 is a graph showing an example of correction image data.

FIG. 9 schematically shows the LUT data Dj2 recorded on the LUT 12. The LUT data Dj2 is set within a range of number of gradations that can be displayed on the display device 11. In other words, in the case where number of gradations that can be displayed on the display device 11 is 8 bits, the LUT data Dj2 is set so as to correspond to a gray level from 0 to 255. The LUT data Dj2 that corresponds to a case where there is no change in number of gradations between the object frame and the frame which is one frame previous to the foregoing object frame is the frame data corresponding to the desired number of gradations described above.

The adder 13 in FIG. 4, where the LUT data Dj2 is inputted from the LUT 12 where the LUT data Dj2 is set as described above, outputs correction data Dk1 obtained by subtracting the object frame data Di1 from the foregoing LUT data Dj2 to a correction data controller 14.

Figure 10:
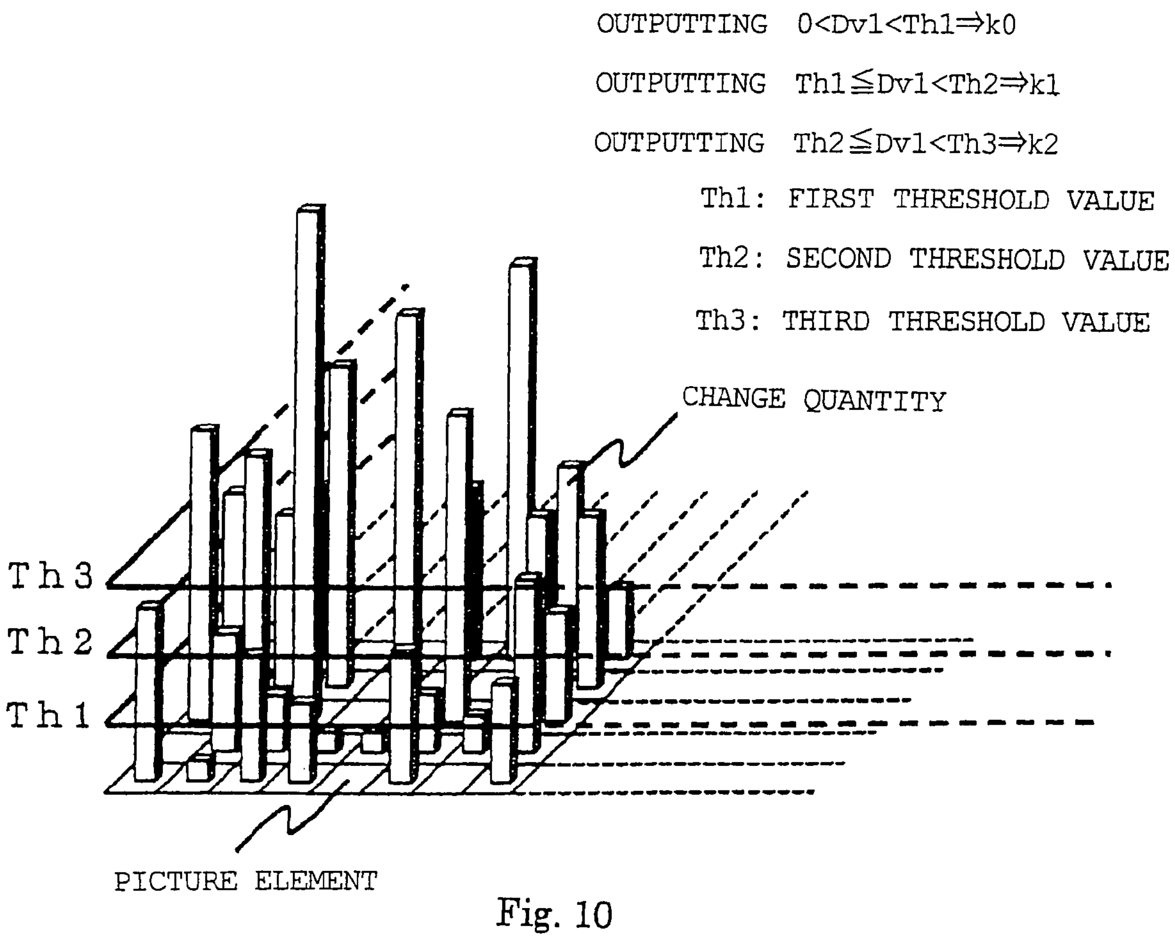
FIG. 10 is a graph showing an example of setting a threshold value in a correction data controller.

The correction data controller 14 is provided with a threshold value Th. If the change quantity Dv1 outputted from the change-quantity calculating device 8 is smaller than the foregoing threshold value Th, the correction data controller 14 corrects the correction data Dk1 so as to diminish the correction data Dk1 in size and outputs the corrected correction data Dm1 to the adder 15. In concrete terms, the foregoing corrected correction data Dm1 is produced through the following expressions (1) and (2).

$$Dm1 = k \times Dk1 \qquad (1)$$

$$k = f(Th, Dv1) \qquad (2)$$

where $0 \leqq k \leqq 1$ k=f(Th, Dv1) is an arbitrary function that becomes 0 when Dv1=0. Instead of using the function as the coefficient k as shown in the foregoing expression (2), it is also preferable to arrange plural threshold values and output the coefficient k according to the value of the change quantity Dv1 corresponding to the picture element of the liquid crystal panel of the display device 11 as shown in FIG. 10. The foregoing threshold value Th is set according to the structure of the system, the material characteristics of the liquid crystal used in the system, and so on. Although plural threshold values are set in FIG. 10, it is also preferable to arrange only one threshold value as a matter of course. Although the change quantity Dv1 is used in the foregoing description, it is also possible to control the correction data Dk1 on the basis of (Di1-Dp0) in place of the foregoing change quantity Dv1.

Figure 11:
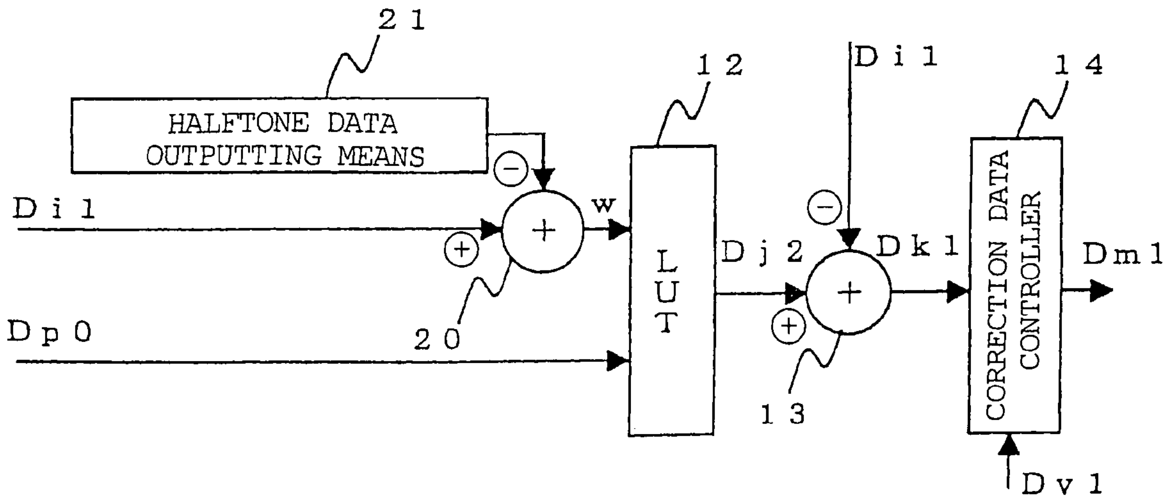
FIG. 11 is a diagram showing an example of constitution of a correction data output device in the case where halftone data outputting means is used in Embodiment 1.

Although the object frame data Di1 and the previous frame reproduction image data Dp0 themselves are inputted to the LUT in the foregoing example, the data inputted to the LUT can be any signal corresponding to number of gradations of the object frame data Di1 or the previous frame reproduction image data Dp0, and it is possible to construct the correction data output device 30 as shown in FIG. 11.

In FIG. 11, the object frame data Di1 is inputted to a adder 20. Data corresponding to a halftone (Data corresponding to a halftone is hereinafter referred to as halftone data.) is inputted from halftone data outputting means 21 to the adder 20.

The adder 20 subtracts the foregoing halftone data from the foregoing object frame data Di1 and outputs a signal corresponding to number of gradations of the object frame (A signal corresponding to number of gradations of the object frame is hereinafter referred to as a gray-level signal w.) to the LUT 12.

The halftone data can be any data corresponding to a halftone in the gradations that can be displayed on the display device 11. The gray-level signal w outputted from the adder 20 when data corresponding to ½ gray level is outputted from the halftone data outputting means is explaned below with reference to FIG. 12.

Figure 12:
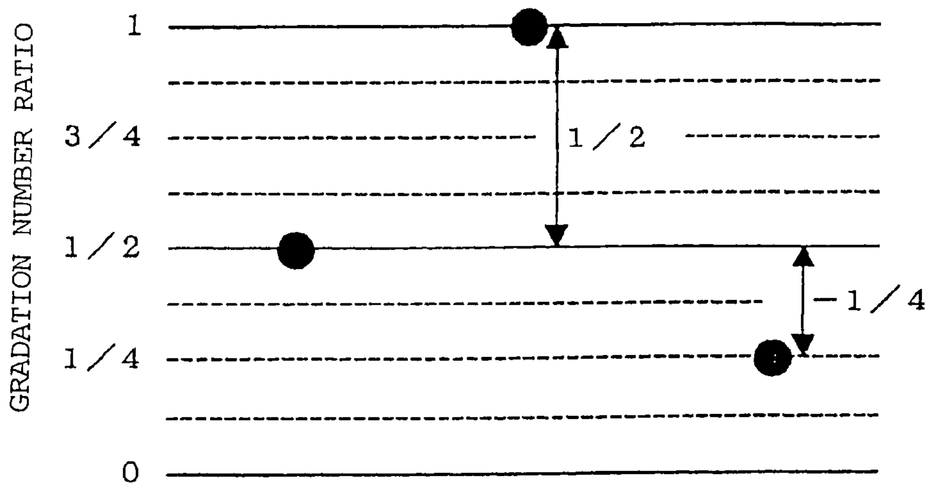
FIG. 12 is a diagram for explaining a gradation number signal.

In FIG. 12, a black dot indicates number of gradations of the object frame. ① in the drawing indicates a case where the gray-level ratio of the foregoing object frame is 1/2, ② indicates a case where the gray-level ratio of the foregoing object frame is 1, and ③ indicates a case where the gray-level ratio of the foregoing object frame is 1/4. Concerning the gray-level ratio on the axis of ordinates in the drawing, 1 corresponds to a maximum value (for example, 255 gray level in case of an 8-bit gray-level signal) in the gradations that can be displayed on the display device, and 0 corresponds to a minimum value (for example, 0 gray level in case of an 8-bit gray-level signal).

In the case of [1] in the drawing, the object frame data Di1 is the data corresponding to the gray-level ratio 1/2, therefore w=0 is outputted from the adder 20 by subtracting ½ gray level data from the foregoing object frame data Di1.

In the same way, in the case of (2) in the drawing, the object frame data Di1 is the data corresponding to the gray-level ratio 1, therefore w=1/2 is outputted from the adder 20. In the case of (3) in the drawing, the object frame data Di1 is the data corresponding to the gray-level ratio 1/4, therefore w=−1/4 is outputted from the adder.

The LUT 12 outputs the LUT data Dj2 on the basis of the inputted gray-level signal w and the previous frame reproduction image data Dp0. Although a process using the halftone data is carried out only for the object frame data Di1 in the example described above, it is also preferable to carry out the same process for the previous frame reproduction image data Dp0 as a matter of course. Therefore, in the correction data output device, it is possible to arrange the halftone data outputting means for either the object frame data Di1 or the previous frame reproduction image data Dp0 as shown in FIG. 11 or arrange the halftone data outputting means for both the object frame data Di1 and the previous frame reproduction image data Dp0.

Figure 13:
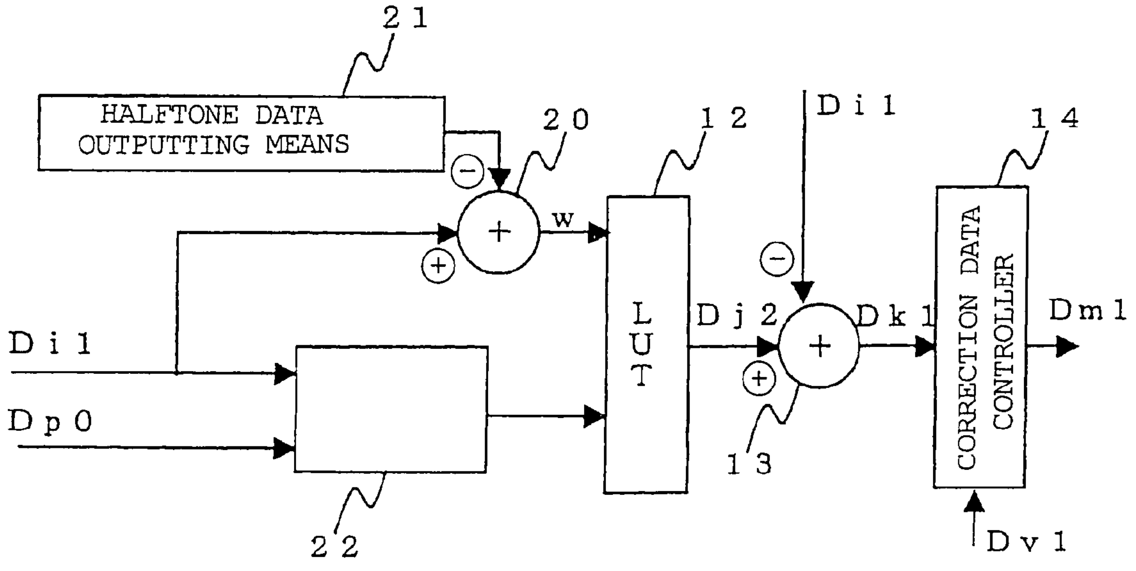
FIG. 13 is a diagram showing an example of constitution in the case where gradation change detecting means is used in the correction data output device according to Embodiment 1.

FIG. 13 shows another example of the correction data output device 30. In FIG. 13, the object frame data Di1 is inputted to gray-level change detecting means 22 and the adder 20.

The adder 20 outputs the gray-level signal w on the basis of the object frame data Di1 and the halftone data as described above. On the other hand, the foregoing gray-level change detecting means 22 outputs a signal (hereinafter referred to as a gray-level change signal) corresponding to a change in number of gradations between the object frame and the frame which is one frame previous to the foregoing object frame to the LUT 12 on the basis of the object frame data Di1 and the previous frame reproduction image data Dp0. The gray-level change signal is, for example, produced through an operation such as subtraction on the basis of the object frame data Di1 and the previous frame reproduction image data Dp0 and outputted, and it is also preferable to arrange an LUT and output the data from the foregoing LUT.

The LUT 12 where the gray-level signal w and the gray-level change signal are inputted outputs the LUT data Dj2 on the basis of the foregoing gray-level signal w and the foregoing gray-level change signal.

Figure 14:
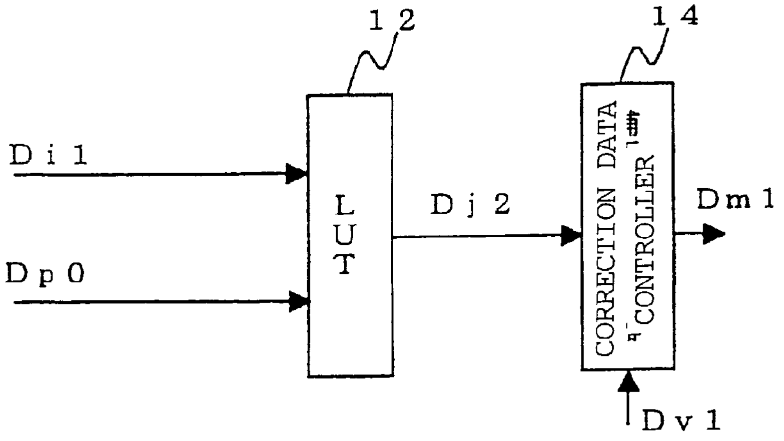
FIG. 14 is a diagram showing an example of constitution of the correction data output device in the case where LUT data in the LUT in Embodiment 1 are used as a coefficient.

It is preferable that data obtained by adding the correction data to the frame data corresponding to the desired number of gradations as described above or the foregoing correction data is set as the foregoing LUT data Dj2 recorded on the LUT. It is also preferable to set a coefficient so that the foregoing object frame data Di1 is corrected by multiplying the object frame data Di1 by this coefficient. In the case where the mentioned correction data or the coefficient is set as the LUT data Dj2, it is not necessary to arrange the adder 13 in the correction data output device 30, therefore the foregoing correction data output device is constructed as shown in, for example, FIG.14, and the foregoing LUT data Dj2 is outputted as the correction data Dk1.

Although the object frame data Di1 is corrected by adding the correction data Dm1 in the foregoing description in Embodiment 1, the foregoing correction is not limited to addition. For example, it is also preferable to use the foregoing coefficient as correction data and correct the object frame data Di1 through multiplication. In the case where the above-mentioned data obtained by adding the correction data to the frame data corresponding to the desired number of gradations is set as the LUT data Dj2, it is preferable to calculate the correction data by subtracting the object frame data Di1 from the foregoing data obtained by adding the correction data to the frame data corresponding to the desired number of gradations as described above in Embodiment 1, and it is also preferable to correct the LUT data Dj2 itself which is the foregoing data obtained by adding the correction data to the frame data corresponding to the desired number of gradations in place of the object frame data Di1 and output the foregoing corrected LUT data Dj2 as the corrected frame data Dj1 to the display device 11. In other words, the above-mentioned correction is carried out through an operation, conversion of data, replacement of data, or any other method that makes it possible to properly control the mentioned object frame data.

Figure 15:
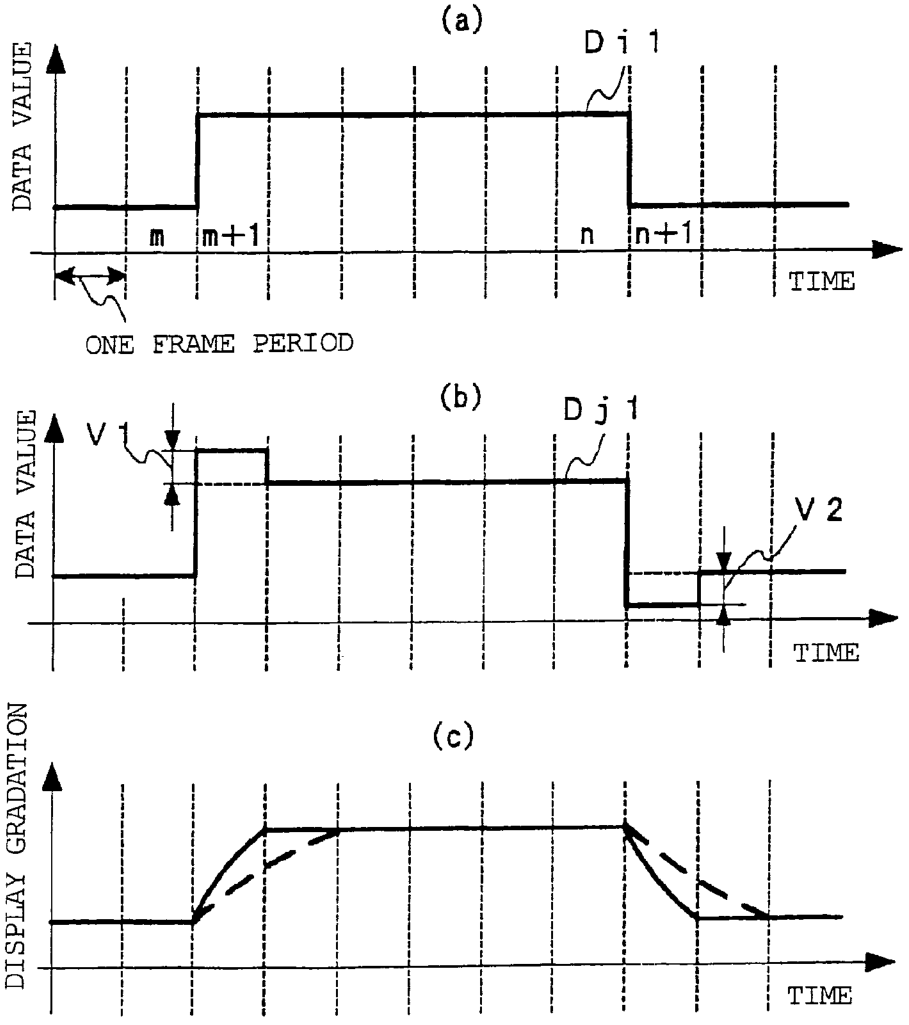
FIGS. 15(*a*), (*b*) and (*c*) are graph diagrams each showing an example of change in gradation in a display frame in the case where quantitative change between number of gradations of an object frame and that of a frame, which is one frame previous to the mentioned object frame, is larger than a threshold value.

FIG. 15 is a graphic diagram showing the display gradation of the frame displayed on the display device 11 in the case where the change quantity Dv1 is larger than the threshold value Th, i.e., when the correction data Dk1 is not corrected.

Referring to FIG. 15, (*a*) indicates value of the object frame data Di1, and (*b*) indicates value of the corrected frame data Dj1. FIG. 15(*c*) indicates change in display gradation of the frame displayed on the display device 11 on the basis of the corrected frame data Dj1. In FIG.15(*c*), the change in display gradation indicated by the broken line is the one in the gradation in the case where the frame is displayed on the display device 11 on the basis of the object frame data Di1.

When the object frame data Di1 increases from m frame to (m+1) frame in FIG. 15(*a*), the mentioned object frame data Di1 are corrected and changed into the corrected frame data Dj1 having a value (Di1+V1) as shown in FIG. 15(*b*). When the object frame data Di1 decrease from n frame to (n+1) frame in FIG. 15(*a*), the object frame data Di1 are corrected and changed into the corrected frame data Dj1 having a value (Di1−V2).

The object frame data Di1 are corrected and the frame is displayed on the display device 11 on the basis of the corrected frame data Dj1 obtained by the correction as described above, and this makes it possible to drive the liquid crystal so that the target number of gradations is achieved substantially in one frame period.

Figure 16:
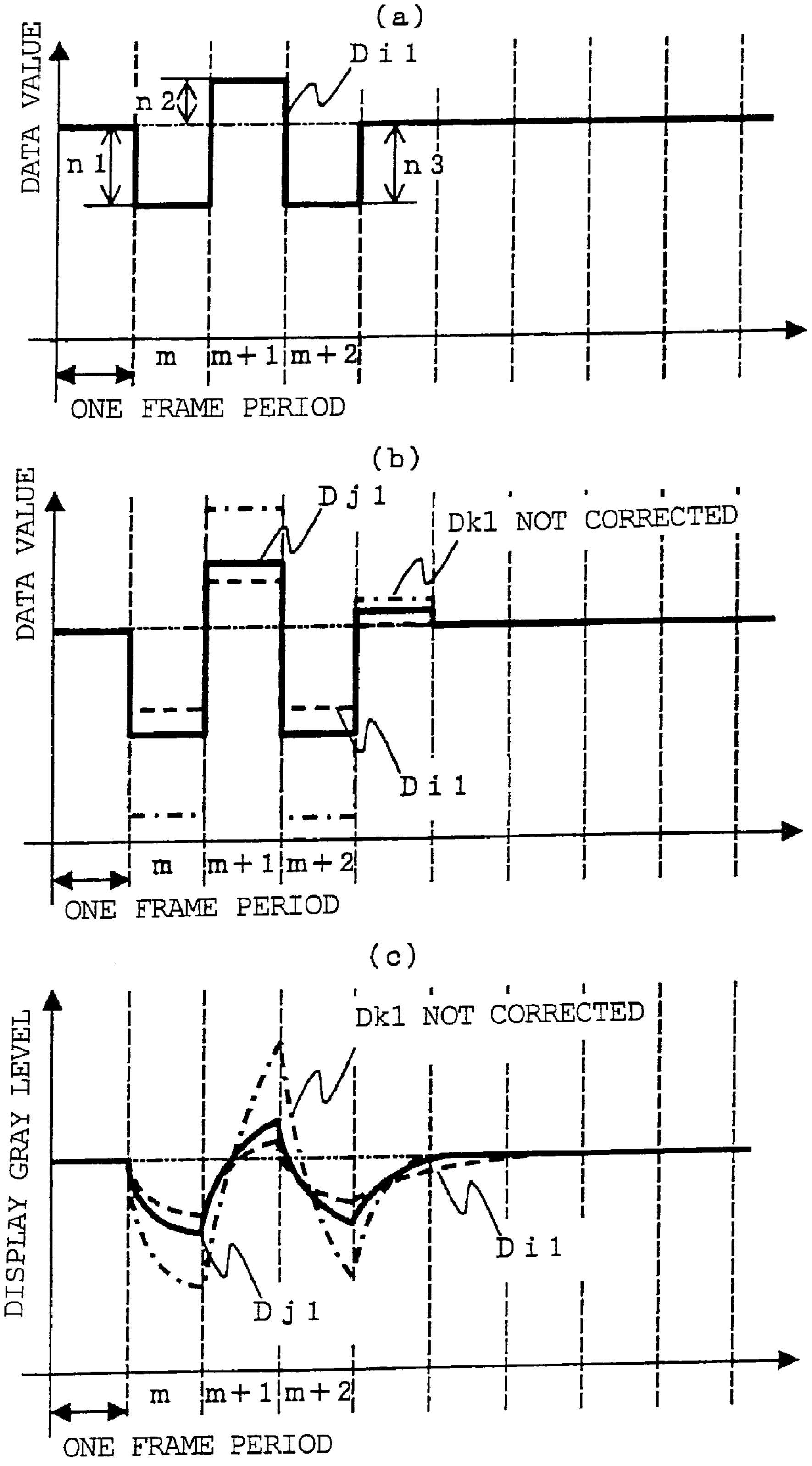
FIGS. 16(*a*), (*b*) and (*c*) are graph diagrams each showing an example of change in gradation in the display frame in the case where quantitative change between number of gradations of the object frame and that of the frame, which is one frame previous to the mentioned object frame, is smaller than a threshold value.

On the other hand, in the case where the change quantity Dv1 is smaller than the threshold value Th, i.e., in the case where the correction data Dk1 is corrected, the display gradation of the frame displayed on the display device 11 changes as shown in FIG. 16.

Referring to FIG. 16, (*a*) indicates value of the object frame data Di1, and (*b*) indicates value of the corrected frame data Dj1. FIG. 16(*c*) indicates display gradation of the frame displayed on the basis of the mentioned corrected frame data Dj1. Referring to (*b*), value of the corrected frame data Dj1 is indicated by the solid line, and for the purpose of comparison, the value of the object frame data Di1 is indicated by the broken line, and the value of the corrected frame data Dj1 (indicated by 'Dk1 NOT CORRECTED' in the drawing) in the case where the frame data Di1 is corrected without correcting the correction data Dk1 is indicated by the one-dot chain line. The following description is given on the assumption that the image signals include data corresponding to noise components such as n1, n2, and n3 in m, (m+1), and (m+2) in FIG. 16(*a*).

In the case there is any change in the data value due to noise components as shown in m frame, (m+1) frame and (m+2) frame in FIG. 16(*a*), when correcting the object frame data Di1 only on the basis of number of gradations of the object frame and that of the frame being one frame previous to the object frame in the same manner as in the prior arts, the noise components are amplified as indicated by the one-dot chain line in (*b*). As a result, number of gradations of the display frame changes considerably as shown in (*c*), eventually resulting in deterioration in image quality of the display frame.

However, according to the frame data correction device in this Embodiment 1, since the correction data Dk1 for correcting the object frame data Di1 is corrected on the basis of the change quantity between number of gradations of the object frame and that of the frame being one frame previous to the object frame, it becomes possible to suppress amplification of the noise components. Accordingly, the frame is displayed on the basis of the corrected frame data Dj1, and it is therefore possible to improve speed of change in gradation in the display device and prevent image quality of the frame from deterioration.

As described above, according to the image display device of this Embodiment 1, it is possible to improve speed of change in gradation in the display device by correcting the object frame data Di1.

At the time of carrying out the mentioned correction, the correction data for correcting the object frame data Di1 are corrected on the basis of the change quantity between number of gradations of the object frame and that of the frame being one frame previous to the foregoing object frame, and this makes it possible to suppress amplification of the noise components included in the object frame data Di1. It is therefore possible to prevent deterioration in image quality of the display frame due to amplification of noise components, which especially brings about a trouble when the change in gradation is small.

Further, since it is possible to reduce quantity of data by encoding the object frame data Di1 by the encoder 4, it becomes possible to reduce capacity of image memory in the delay device 5. Encoding and decoding are carried out without skipping the object frame data Di1, and this makes it possible to generate the corrected frame data Dj1 corrected and changed into an appropriate value and accurately control the change in gradation in the display device such as liquid crystal panel.

Further, since response characteristics of the liquid crystal vary depending upon material of liquid crystal, configuration of electrode, and so on, the LUT 12 provided with the LUT data Dj2 coping with those conditions makes it possible to control the change in gradation in the display device conforming to the characteristics of the liquid crystal panel.

Furthermore, the object frame data Di1 inputted to the frame data correction device 10 is not encoded. As a result, the frame data correction device 10 generates the corrected frame data Dj1 on the basis of the mentioned object frame data Di1 and the previous frame reproduction image data Dp0, and it is therefore possible to prevent influence of errors upon the corrected frame data Dj1 due to encoding or decoding.

Embodiment 2

Although the foregoing Embodiment 1 describes a case that the data inputted to the LUT 12 are of 8 bits, it is possible to input data of any bit number to the LUT 12 on condition that the bit number can generate correction data through an interpolation process or the like. In this Embodiment 2, an interpolation process in the case where an arbitrary bit number of data is inputted to the LUT 12.

Figure 17:
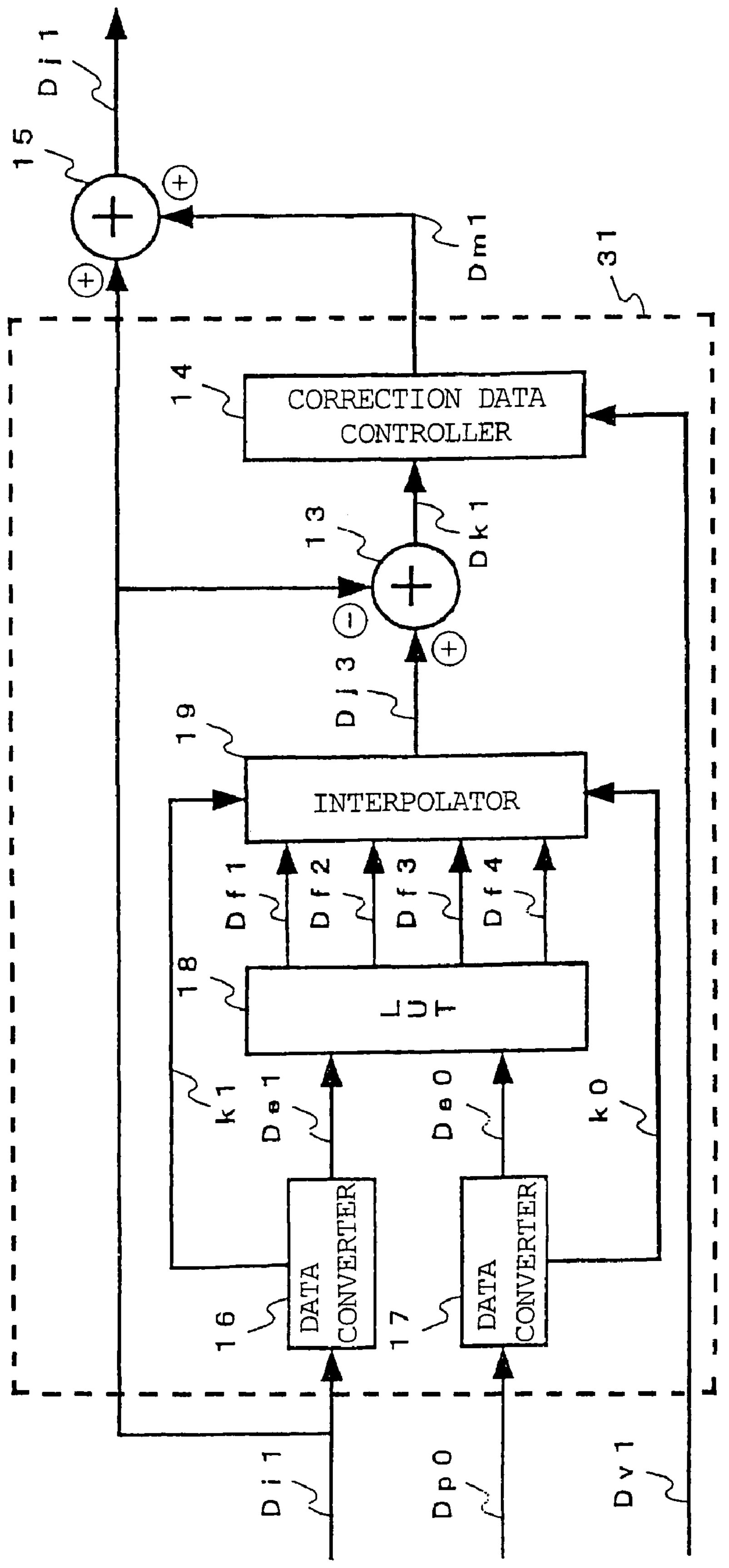
FIG. 17 is a diagram showing constitution of a frame data correction device according to Embodiment 2.

FIG. 17 is a diagram showing a constitution of the frame data correction device 10 according to this Embodiment 2. The constitution other than that of the frame data correction device 10 shown in FIG. 17 is the same as in the foregoing Embodiment 1, and further description of the constitution similar to that of the foregoing Embodiment 1 is omitted herein.

Referring to FIG. 17, the object frame data Di1, the previous frame reproduction image data Dp0, and the change quantity Dv1 are inputted to a correction data output device 31 disposed in the frame data correction device 10 according to this Embodiment 2. The mentioned object frame data Di1 is inputted also to the adder 15.

The correction data output device 31 outputs the correction data Dm1 to the adder 15 on the basis of the mentioned object frame data Di1, the previous frame reproduction image data Dp0 and the change quantity Dv1.

The adder 15 outputs the corrected frame data Dj1 to the display device 11 on the basis of the mentioned object frame data Di1 and the correction data Dm1.

The correction data output device 31 of this Embodiment 2 is hereinafter described.

The foregoing object frame data Di1 inputted to the correction data output device 31 are inputted to a first data converter 16, and the previous frame reproduction image data Dp0 are inputted to a second data converter 17. Numbers of bits of the mentioned object frame data Di1 and the previous frame reproduction image data Dp0 are reduced through linear quantization, non-linear quantization, or the like in the mentioned first data converter and the second data converter.

The first data converter 16 outputs first bit reduction data De1, which are obtained by reducing number of bits of the mentioned object frame data Di1, to an LUT 18. The second data converter 17 outputs second bit reduction data De0, which are obtained by reducing number of bits of the mentioned previous frame reproduction image data Dp0, to the LUT 18. In the following description, the object frame data Di1 and the previous frame reproduction image data Dp0 are reduced from 8 bits to 3 bits.

The first data converter 16 outputs a first interpolation coefficient k1 to an interpolator 19, and the second data converter 17 outputs a second interpolation coefficient k0 to the interpolator 19. The mentioned first interpolation coefficient k1 and the second interpolation coefficient k0 are coefficients used in data interpolation in the interpolator 19, which are described later in detail.

The LUT 18 outputs first LUT data Df1, second LUT data Df2, third LUT data Df3, and fourth LUT data Df4 to the interpolator 19 on the basis of the mentioned first bit reduction data De1 and the second bit reduction data De0. The first LUT data Df1, the second LUT data Df2, the third LUT data Df3, and the fourth LUT data Df4 are hereinafter generically referred to as LUT data.

Figure 18:
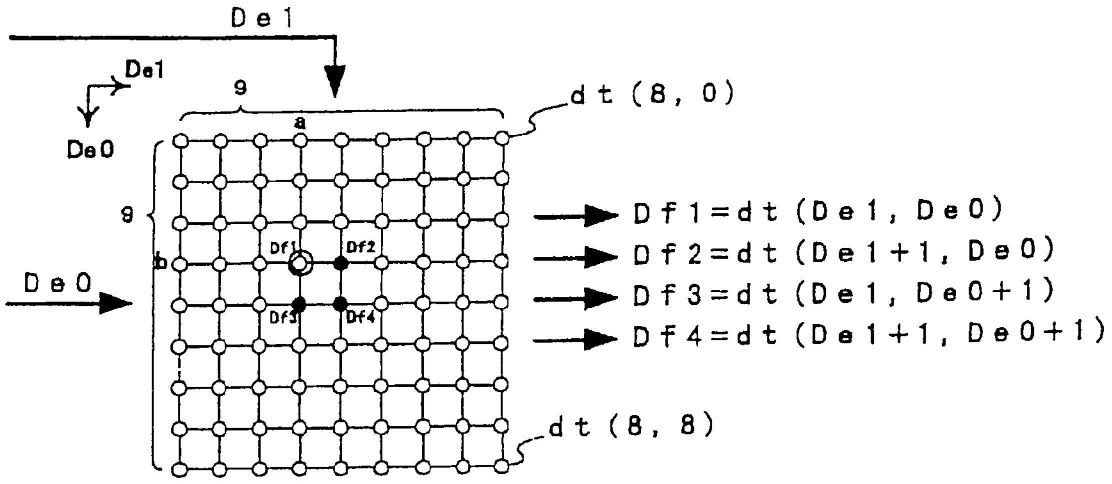
FIG. 18 is a diagram showing constitution of an LUT according to Embodiment 2.

FIG. 18 is a schematic diagram showing a constitution of the LUT 18 shown in FIG. 17. In the LUT 18, the mentioned first LUT data Df1 are determined on the basis of the mentioned first bit reduction data De1 and the second bit reduction data De0. Describing more specifically with reference to FIG. 18, on the assumption that the first bit reduction data De1 correspond to the position indicated by "a" and the second bit reduction data De0 correspond to the position indicated by "b", the corrected frame data at a double circle in the drawing is outputted as the mentioned first LUT data Df1.

The LUT data adjacent to the LUT data Df1 in the De1 axis direction in the drawing are outputted as the second LUT data Df2. The LUT data adjacent to the LUT data Df1 in the De0 axis direction in the drawing are outputted as the third LUT data Df3. The LUT data adjacent to the third LUT data Df3 in the De1 axis direction in the drawing are outputted as the fourth LUT data Df4.

The LUT 18 is composed of (9×9) LUT data as shown in FIG. 18. This is because the mentioned first bit reduction data De1 and the second bit reduction data De0 are data of 3 bits and have values each corresponding to a value from 0 to 7 and because the LUT 18 outputs the mentioned second LUT data Df2 and so on.

Interpolation frame data Dj3, which are obtained through data interpolation on the basis of the mentioned LUT data outputted from the LUT 18 as described above, the first interpolation coefficient k1 outputted from the mentioned first data converter and the second interpolation coefficient k0 outputted from the mentioned second data converter, are outputted from the interpolator 19 shown in FIG. 17 to the adder 13.

The interpolation frame data Dj3 outputted from the interpolator 19 are calculated on the basis of the mentioned LUT data and so on using the following expression (3).

$$Dj3=(1-k0)\times\{(1-k1)\times Df1+k1\times Df2\}+k0\times\{(1-k1)\times Df3+k1\times Df4\} \quad (3)$$

The above expression (3) is now described with reference to FIG. 19.

Figure 19:
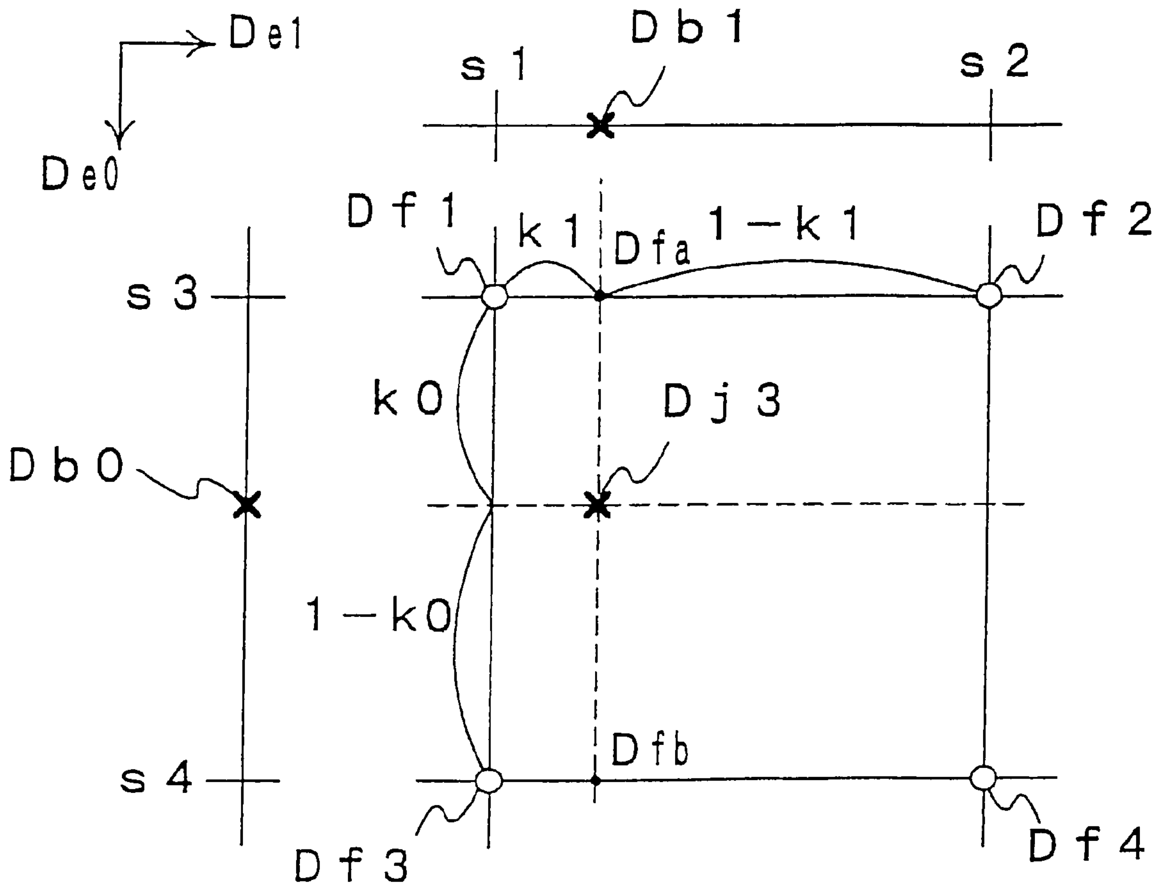
FIG. 19 is a diagram for explaining interpolation frame data according to Embodiment 2.

Dfa in FIG. 19 is first interpolation frame data obtained through interpolation of the first LUT data Df1 and the second LUT data Df2, and is calculated using the following expression (4).

$$\begin{aligned} Dfa &= Df1 + k1\times(Df2 - Df1) \\ &= (1-k1)\times Df1 + k1\times Df2 \end{aligned} \quad (4)$$

Dfb in FIG. 19 is second interpolation frame data obtained through interpolation from the third LUT data Df3 and the fourth LUT data Df4, and is calculated using the following expression (5).

$$\begin{aligned} Dfb &= Df3 + k1\times(Df4 - Df3) \\ &= (1-k1)\times Df3 + k1\times Df4 \end{aligned} \quad (5)$$

Interpolation frame data Dj3 are obtained through interpolation based on the mentioned first interpolation frame data Dfa and the second interpolation frame data Dfb.

$$\begin{aligned} Dj3 &= Dfa + k0\times(Dfb - Dfa) \\ &= (1-k0)\times Dfa + k0\times Dfb \\ &= (1-k0)\times\{(1-k1)\times Df1 + k1\times Df2\} + \\ &\quad k0\times\{(1-k1)\times Df3 + k1\times Df4\} \end{aligned}$$

Referring to FIG. 19, reference numerals s1 and s2 indicate threshold values used when number of quantized bits of the object frame data Di1 is converted by the first data converter 16 (s1 and s2 are hereinafter referred to as first threshold value and second threshold value respectively). Reference numerals s3 and s4 indicate threshold values used when number of quantized bits of the previous frame reproduction image data Dp0 is converted by the data converter 17 (s3 and s4 are hereinafter referred to as third threshold value and fourth threshold value respectively).

The mentioned first threshold value s1 is a threshold value that corresponds to the mentioned first bit reduction data De1, and the mentioned second threshold value s2 is a threshold value that corresponds to bit reduction data De1+1 corresponding to number of gradations one level higher than number of gradations to which the first bit reduction data De1 corresponds. The mentioned third threshold value s3 is a threshold value that corresponds to the mentioned second bit reduction data De0, and the mentioned fourth threshold value s4 is a threshold value that corresponds to bit reduction data De0+1 corresponding to number of gradations one level higher than number of gradations corresponding to the second bit reduction data De0.

The first interpolation coefficient k1 and the second interpolation coefficient k0 are calculated using the following expressions (6) and (7) respectively.

$$k1=(Db1-s1)/(s2-s1) \quad (6)$$

where: $s1<Db1\leqq s2$ $$k0=(Db0-s3)/(s4-s3) \quad (7)$$

where: $s3<Db0\leqq s4$

The interpolation frame data Dj3 calculated through the interpolation operation shown in the above expression (3) is outputted to the adder 13 in FIG. 17. Subsequent operation is carried out in the same manner as in the correction data output device 30 in the foregoing Embodiment 1. Although the interpolator 19 in this Embodiment 2 carries out in the form of linear interpolation, it is also preferable to calculate the interpolation frame data Dj3 through an interpolation operation using a higher order function.

As described above, it is possible to reduce conversion of number of bits through linear quantization or non-linear quantization in the mentioned first data converter 16 and the second data converter 17. At the time of converting number of bits through the non-linear quantization, a high quantization density is set in an area where there is a great difference between the values of neighboring LUT data, thereby reducing errors in the corrected frame data Dj3 due to reduction in number of bits.

Although described in this Embodiment 2 is a case where conversion of number of bits is reduced from 8 bits to 3 bits, it is possible to select any arbitrary bit number on condition that the interpolation frame data Dj3 is obtained through interpolation by the interpolator 19. In such a case, it is necessary to set number of data in the LUT 18 conforming to the mentioned arbitrary bit number as a matter of course.

When number of bits is converted in the mentioned first data converter 16 and the second data converter 17, it is not always necessary that number of bits of the first bit reduction data De1 obtained by converting number of bits of the object frame data Di1 is coincident to that of the second bit reduction data De0 obtained by converting number of bits of the previous frame reproduction image data Dp0. In other words, it is preferable to convert number of bits of the first bit reduction data De1 and that of the second bit reduction data De0 into different bit numbers, and it is also preferable that number of bits of either the frame data Di1 or the previous frame reproduction image data Dp0 is not converted.

As described above, according to the image display device of this Embodiment 2, it is possible to reduce the LUT data set in the LUT by converting number of bits and reduce capacity of memory such as semiconductor memory necessary for storing the mentioned LUT data. As a result, it is possible to reduce circuit scale of the entire apparatus and obtain the same advantages as in the foregoing Embodiment 1.

Further, by calculating the interpolation coefficient at the time of converting bit number, the interpolation frame data is calculated on the basis of the mentioned interpolation coefficient. As a result, it possible to reduce influence of quantization error due to conversion of number of bits upon the interpolation frame data Dj3.

The correction data controller 14 in this Embodiment 2 outputs the correction data Dm1 as 0 when the change quantity Dv1 is 0. Therefore, in the case where the object frame data Di1 is equal to the previous frame reproduction image data Dp0, i.e., in the case where number of gradations of the object frame remains unchanged from that of the frame which is one frame previous to the object frame, it is possible to accurately correct the image data even if the interpolation frame data Dj3 is not equal to the object frame data Di1 due to any error or the like occurred in the process of calculation by the interpolator 19.

Although in the foregoing Embodiment 1 or 2, a liquid crystal panel is taken as an example, the correction data output device, etc. described in the foregoing Embodiment 1 or 2 are also applicable to any display element (for example, electronic paper) that displays an image by operation of a predetermined material such as liquid crystal in the liquid crystal panel.

While the presently preferred embodiments of the present invention have been shown and described, it is to be understood that these disclosures are for the purpose of illustration and that various changes and modifications may be made without departing from the scope of the invention as set forth in the appended claims

What is claimed is:

1. An image correction device comprising:

an encoder which encodes inputted object frame data and produces an encoded object frame data;

a delay device connected to said encoder, for delaying the encoded object frame data by one frame and outputting an encoded previous frame data;

a first decoder connected to said encoder and decoding said encoded object frame data to produce decoded object frame data;

a second decoder, connected to said delay device and decoding said encoded previous frame data to produce decoded previous frame data;

a change quantity calculating device that receives said decoded object frame data from said first decoder and said decoded previous frame data from said second decoder, and outputs a change quantity derived from subtracting said decoded object frame data from said decoded previous frame data;

a previous frame image reproducer that receives said change quantity and said inputted object frame data and adds said change quantity to said inputted object frame data producing previous frame reproduction image data; and a frame data correction device that outputs corrected object frame data based on said inputted object frame data, said change quantity and said previous frame reproduction image data.

2. The image correction device according to claim 1, wherein the frame data correction device comprises a bit number converting device that reduces a number of bits of the inputted object frame data or a number of bits of the previous frame reproduction image data.

3. The image correction device according to claim 1, wherein said frame data correction device has a data table composed of correction image data, and said correction image data are outputted from said data table on a basis of said inputted object frame data and said previous frame reproduction image data.

4. The image correction device according to claim 1, wherein said frame data correction device outputs said corrected object frame data that correspond to a number of gradations of said inputted object frame data.

5. The image correction device according to claim 1, wherein the frame data correction device corrects a correction image data and outputs a corrected correction image data thereby increasing or decreasing said correction image data.

6. The image correction device according to claim 1, further comprising a recorded device for recording the inputted object frame data included in the inputted image signal.

7. The image correction device according to claim 1, wherein the frame data correction device includes:

a lookup table containing gradation data, the lookup table outputting gradation data based on said inputted object frame data and said previous frame reproduction image data;

an arithmetic device that subtracts said inputted object frame data from said gradation data producing correction gradation data; and a data correction controller that receives said change quantity and said correction gradation data, compares said change quantity against a threshold and modifies the correction gradation data based on whether the change quantity is greater, equal to or less than the threshold value.

8. An image correcting method comprising the steps of:

encoding inputted object frame data by an encoder and producing encoded object frame data;

delaying said encoded object frame data by one frame using a delay device and outputting encoded previous frame data;

decoding said encoded object frame data by a first decoder connected to said encoder to produce decoded object frame data;

decoding said encoded previous frame data by a second decoder to produce decoded previous frame data, said second decoder connected to said delay device;

outputting a change quantity derived from subtracting said decoded object frame data from said decoded previous frame data using a change quantity calculating device that receives said decoded object frame data from said first decoder and said decoded previous frame data from said second decoder;

producing previous frame reproduction image data by a previous frame image reproducer that receives said change quantity and said inputted object frame data and adds the change quantity to said inputted object frame data; and outputting corrected object frame data by a frame data correction device based on said inputted object frame data, said change quantity and said previous frame reproduction image data.

9. The image correcting method of claim 8, wherein said change quantity between the decoded object frame data and the decoded previous frame data is outputted, and the correction image data is corrected on a basis of said change quantity.

10. A frame data correcting method comprising a step of correcting said inputted object frame data on a basis of the correction image data corrected by the image correcting method as defined in claim 8.

11. A frame data displaying method comprising a step of displaying a frame corresponding to object frame data corrected by the frame data correcting method as defined in claim 10 on a basis of said corrected object frame data.

12. The image correcting method according to claim 8, wherein the image correction method further comprises steps of:

outputting gradation data based on said inputted object frame data and said previous frame reproduction image data by a lookup table containing gradation data;

subtracting said inputted object frame data from said gradation data producing correction gradation data; and modifying the correction gradation data by comparing said change quantity against a threshold and modifying the correction gradation data based on whether the change quantity is greater, equal to or less than the threshold value.

* * * * *